3,563,108
HELICALLY-TOOTHED SPUR GEAR TRANSMISSION
Robert Wydler, Zurich, Switzerland, assignor to Maag Gear Wheel & Machine Company Limited, Zurich, Switzerland
Filed Apr. 17, 1969, Ser. No. 817,044
Claims priority, application Germany, Apr. 20, 1968, P 17 50 421.1
Int. Cl. F16h 55/04
U.S. Cl. 74—458       2 Claims

ABSTRACT OF THE DISCLOSURE

In a helically-toothed cylindrical gear transmission having a tooth height which is variable along the tooth width, the tooth height of at least one of the gearwheels is smaller at the trailing end of the tooth width than at the leading end.

---

Figure 1:
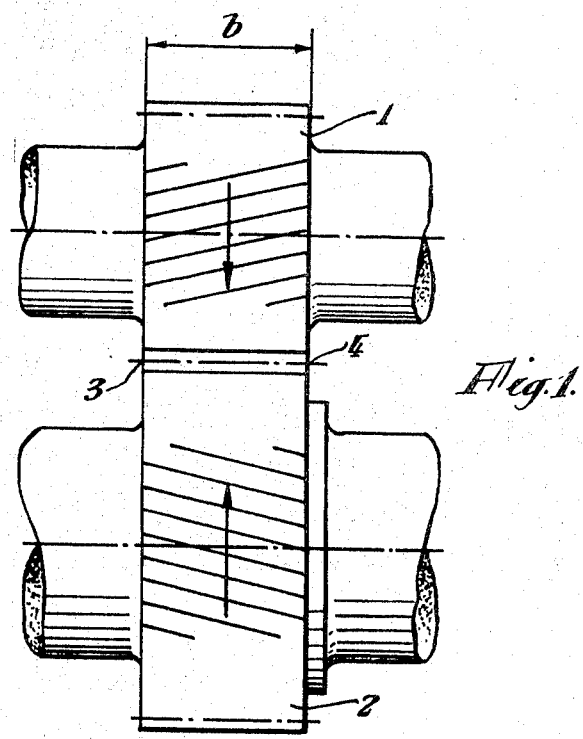

This invention relates to a helically-toothed cylindrical gear transmission in which the teeth have a height which is variable along the tooth width.

The prior art discloses, in German patent specification No. 38,560, gear wheels in which the axial section of the tooth root is constructed in ridge form or as one-sided cone in order to laterally displace any dirt disposed in the tooth root.

The prior art also discloses, in German patent specification No. 317,280, gearwheels in which the root and/or tip surfaces of the teeth are constructed in concave or convex curvilinear form in the direction of the tooth width in order to increase the bending resistance.

The prior art also discloses, in German patent specification No. 540,956, gearwheel transmissions with straight teeth in which the tooth root and tip surfaces of one wheel are concave while those of the other gearwheel are convex in order to permit gradual meshing and de-meshing of the teeth.

The prior art also discloses, in United States of America patent No. 3,043,158, a shift-gear transmission with straight-toothed cylindrical gears, whose tooth flanks and roots are slightly tapered in order to avoid unintentional demeshing of the shifting gearwheels.

High-speed transmission systems with helically-toothed cylindrical gears which operate at high circumferential speeds of, for example, 120 metres per second and more, are subject to a temperature gradient which is variable over the tooth width, the temperature rising towards that end of the tooth width which trails during meshing of the gears. This results in thermal expansion of the gearwheels in a manner which is variable along the tooth width and accordingly causes the pressure to vary over said tooth width so that, in an extreme case, it is possible for the transmission to be damaged. This phenomenon may be explained in the following manner: When the mating teeth dip into the tooth gaps, the air is displaced from the ends of the tooth width which lead in the meshing operation towards the ends of the tooth width which trail, the air being thus compressed. As the pressure increases, the temperature increases towards the said trailing end of the tooth width. That space which is disposed between the tip surface of one gearwheel and the root surface of the other gearwheel, on a section through the axes of the gearwheels, will then substantially correspond to the smallest space during compression. Compression takes place, at the aforementioned circumferential speed, within approximately 0.0001 second.

It is the object of the invention to provide a helically-toothed cylindrical gear transmission in which the temperature level and the temperature rise due to compression of the air between the meshing teeth are relatively low over the whole tooth width.

According to the invention, the tooth height of at least one gearwheel of the transmission is smaller at the end of the tooth width which trails during the meshing operation than at that end of the tooth width which leads during said meshing operation.

In a preferred embodiment, the tip surface of at least one gearwheel of the transmission is a portion of a frusto-conical surface.

Since the cross-section for the escape of the compressed air thus expands, diffusor-like, in the direction of the tooth width, a higher temperature is obtained at the ends of the teeth width at which meshing leads and during incipient compression, by contrast to a normal helical-tooth system, while the temperature at the end of compression is reduced at the tooth width ends at which meshing trails. The compression ratio depends on the space to which the tooth gap is reduced after inward-plunging of the mating tooth, on the initial condition of the air at the beginning of compression, and on the magnitude of the cross-section for the escape of the compressed air.

Figure 2:
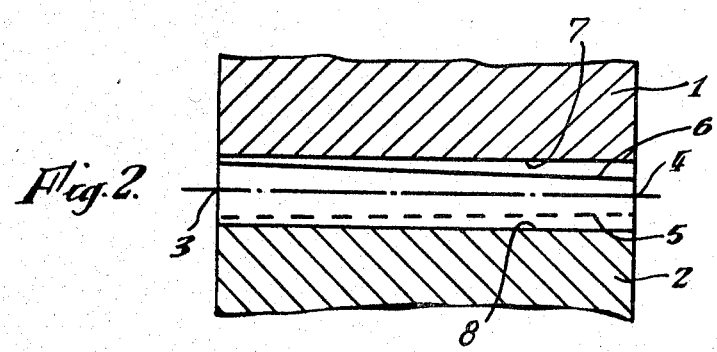

One embodiment of the invention will now be described with reference to the accompanying diagrammatic drawings, wherein:

FIG. 1 is an elevation of a helically-toothed cylindrical gear transmission having a tooth system according to the invention; and FIG. 2 is a fragmentary sectional elevation, to an enlarged scale, of the meshing teeth of the transmission shown in FIG. 1.

In the transmission shown in FIG. 1, two helically toothed cylindrical gears 1 and 2 rotate in the directions indicated by the two arrows thereon. The numeral 3 indicates the ends of the tooth width $b$ which lead in the meshing operation, while the numeral 4 indicates the ends of the tooth width which trail in said meshing operation. The tip surfaces 5 and 6 of the two gearwheels 1 and 2 are portions of frusto-conical surfaces and converge on to each other towards the tooth width ends 4 the root of each tooth is located in a cylinder throughout the width of the tooth as indicated by lines 7 and 8 respectively of the gears 1 and 2. Thereby, the tip circle diameters of the gearwheels diminish progressively from the tooth width ends 3 towards the tooth width ends 4, and the space between tooth flanks increases progressively towards the ends 4. Accordingly, more uniform pressure and temperature conditions, than hitherto, are obtained along the tooth width $b$ for the air which is expelled during rotation of the gearwheels.

In practical operation, not only air but also any air-oil mist mixture will be expelled, but this will be subject to the same thermodynamic principles as air alone.

What I claim and desire to secure by Letters Patent is:

1. Helically-toothed cylindrical gear transmission having a tooth height which is variable along the tooth width, characterized in that the tooth height of at least one gearwheel of the transmission progressively decreases from the end of the tooth width which leads during the meshing operation to the end of the tooth width which trails during said meshing operation, the tip surface is a portion of a frusto-conical surface, and the roots of the teeth are portions of a cylinder.

2. Helically-toothed cylindrical gear transmission according to claim 1, characterized in that the tip surface of at least one gearwheel of the transmission is a portion of a frusto-conical surface.

References Cited

UNITED STATES PATENTS

| | | | |
|---|---|---|---|
| 2,982,221 | 5/1961 | Whitfield | 103—126 |
| 3,327,548 | 6/1967 | Welch | 74—462X |

FOREIGN PATENTS

| | | | |
|---|---|---|---|
| 521,076 | 2/1921 | France | 74—460 |

LEONARD H. GERIN, Primary Examiner

UNITED STATES PATENT OFFICE
CERTIFICATE OF CORRECTION

Patent No. 3,563,108               Dated February 16, 1971

Inventor(s) ROBERT WYDLER

It is certified that error appears in the above-identified patent and that said Letters Patent are hereby corrected as shown below:

On the printed sheet of drawings the title of the invention should read "HELICALLY-TOOTHED CYLINDRICAL GEAR TRANSMISSION"

Column 1, the title should read "HELICALLY-TOOTHED CYLINDRICAL GEAR TRANSMISSION"; line 8, "20" should read --- 30 ---

Column 2, line 47, after the numeral "4" insert a period; line 48, change "the" to --- The ---

Signed and sealed this 29th day of June 1971.

(SEAL)
Attest:

EDWARD M. FLETCHER, JR.                WILLIAM E. SCHUYLER, JR.
Attesting Officer                      Commissioner of Patents